(12) United States Patent
Yokino et al.

(10) Patent No.: US 10,215,634 B2
(45) Date of Patent: Feb. 26, 2019

(54) SPECTROSCOPE AND METHOD FOR PRODUCING SPECTROSCOPE

(71) Applicant: HAMAMATSU PHOTONICS K.K., Hamamatsu-shi, Shizuoka (JP)

(72) Inventors: Takafumi Yokino, Hamamatsu (JP); Katsumi Shibayama, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/987,563

(22) Filed: May 23, 2018

(65) Prior Publication Data

US 2018/0266883 A1 Sep. 20, 2018

Related U.S. Application Data

(63) Continuation of application No. 15/116,990, filed as application No. PCT/JP2015/053001 on Feb. 3, 2015, now Pat. No. 10,012,538.

(30) Foreign Application Priority Data

Feb. 5, 2014 (JP) ................................. 2014-020666

(51) Int. Cl.
*G01J 3/18* (2006.01)
*G01J 3/02* (2006.01)
(Continued)

(52) U.S. Cl.
CPC ............... *G01J 3/18* (2013.01); *G01J 3/0256* (2013.01); *G01J 3/0286* (2013.01);
(Continued)

(58) Field of Classification Search
CPC ........ G01J 3/021; G01J 3/0208; G01J 3/0243; G01J 3/0259
See application file for complete search history.

(56) References Cited

U.S. PATENT DOCUMENTS 5,550,375 A 8/1996 Peters et al.
2004/0239931 A1 12/2004 Teichmann et al.
(Continued)

FOREIGN PATENT DOCUMENTS

CN 1388362 1/2003
CN 101641580 2/2010
(Continued)

OTHER PUBLICATIONS

International Preliminary Report on Patentability dated Aug. 18, 2016 for PCT/JP2015/053001.

*Primary Examiner* — Maurice C Smith
(74) *Attorney, Agent, or Firm* — Drinker Biddle & Reath LLP

(57) ABSTRACT

A spectrometer includes a light detection element having a substrate made of a semiconductor material, a light passing part provided in the substrate, and a light detection part put in the substrate, a support having a base wall part opposing the light detection element, and side wall parts integrally formed with the base wall part, the light detection element being fixed to the side wall parts, the support being provided with a wiring electrically connected to the light detection part, and a dispersive part provided on a surface of the base wall part on a side of a space. An end part of the wiring is connected to a terminal of the light detection element. An end part of the wiring is positioned on a surface in the base wall part on an opposite side from the side of the space.

8 Claims, 12 Drawing Sheets

(51) Int. Cl.
   *G01J 3/36*    (2006.01)
   *G01J 3/28*    (2006.01)
(52) U.S. Cl.
   CPC ........... *G01J 3/0291* (2013.01); *G01J 3/2803* (2013.01); *G01J 3/36* (2013.01)

(56) References Cited

U.S. PATENT DOCUMENTS

| | | |
|---|---|---|
| 2007/0291266 A1 | 12/2007 | Handa et al. |
| 2008/0225392 A1 | 9/2008 | Ko |
| 2008/0259331 A1 | 10/2008 | Kageyama et al. |
| 2009/0284742 A1 | 11/2009 | Shibayama |
| 2010/0315634 A1 | 12/2010 | Shibayama |
| 2011/0141469 A1 | 6/2011 | Shibayama |
| 2011/0146055 A1 | 6/2011 | Shibayama |
| 2013/0038874 A1 | 2/2013 | Shibayama et al. |
| 2013/0141718 A1 | 6/2013 | Yokino et al. |
| 2014/0268138 A1 | 9/2014 | Yokino et al. |

FOREIGN PATENT DOCUMENTS

| | | |
|---|---|---|
| CN | 101970994 | 2/2011 |
| CN | 202177450 | 3/2012 |
| JP | 2000-298066 A | 10/2000 |
| JP | 2006-145501 A | 6/2006 |
| JP | 2006-245359 A | 9/2006 |
| JP | 2009-210416 A | 9/2009 |
| JP | 2012-173208 A | 9/2012 |
| WO | WO 2013/015008 | 1/2013 |

SPECTROSCOPE AND METHOD FOR PRODUCING SPECTROSCOPE

This is a continuation application of copending application Ser. No. 15/116,990, having a § 371 date of Aug. 5, 2016, which is a national stage filing based on PCT International Application No. PCT/JP2015/053001 filed on Feb. 3, 2015. The copending application Ser. No. 15/116,990 is incorporated by reference herein in its entirety.

TECHNICAL FIELD

The present invention relates to a spectrometer which disperses and detects light, and a method for manufacturing the spectrometer.

BACKGROUND ART

For example, Patent Literature 1 discloses a spectrometer including a light entrance part, a dispersive part for dispersing and reflecting light incident thereon from the light entrance part, a light detection element for detecting the light dispersed and reflected by the dispersive part, and a box-shaped support for supporting the light entrance part, dispersive part, and light detection element.

CITATION LIST

Patent Literature

Patent Literature 1: Japanese Unexamined Patent Publication No. 2000-298066

SUMMARY OF INVENTION

Technical Problem

The above-described spectrometer requires further miniaturization in response to expansion of use. However, as the spectrometer is further miniaturized, detection accuracy of the spectrometer more easily decreases due to various causes.

It is therefore an object of the present invention to provide a spectrometer which can attempt miniaturization while suppressing a decrease in detection accuracy, and a method for manufacturing a spectrometer capable of easily manufacturing such a spectrometer.

Solution to Problem

The spectrometer in accordance with one aspect of the present invention includes a light detection element having a substrate made of a semiconductor material, a light passing part provided in the substrate, and a light detection part put in the substrate, a support having a base wall part opposing the light detection element through a space between the light passing part and the light detection part, and side wall parts integrally formed with the base wall part, the light detection element being fixed to the side wall parts, the support being provided with a wiring electrically connected to the light detection part, and a dispersive part provided on a first surface of the base wall part on a side of the space and configured to disperse and reflect light passing through the light passing part to the light detection part in the space, a first end part of the wiring on a side of the light detection part is connected to a terminal provided in the light detection element, and a second end part of the wiring on an opposite side from the side of the light detection part is positioned on a second surface of the base wall part on an opposite side from the side of the space.

In the spectrometer, an optical path from the light passing part to the light detection part is formed in the space which is formed by the light detection element and the support. In this way, miniaturization of the spectrometer may be attempted. Further, the wiring electrically connected to the light detection part is provided in the support, and the second end part of the wiring on the opposite side from the light detection part side is positioned on the second surface of the base wall part on the opposite side from the space side. In this way, even when an external force acts on the second end part of the wiring, the support is rarely distorted. Thus, it is possible to suppress a decrease in detection accuracy (a shift of a peak wavelength in light detected by the light detection part, etc.) resulting from occurrence of a variance in a positional relationship between the dispersive part and the light detection part. In addition, the second end part of the wiring is formed on the second surface of the base wall part, and thus an external force may be inhibited from acting on the light detection element at the time of mounting, and damage to the light detection element may be reduced when compared to a conventional art in which a circuit board is directly connected to the light detection element. Therefore, the spectrometer may attempt miniaturization while suppressing a decrease in detection accuracy.

In the spectrometer in accordance with one aspect of the present invention, a depression open to the side of the space may be formed in the base wall part, and the dispersive part may be provided on an inner surface of the depression. According to this configuration, it is possible to obtain the highly reliable dispersive part, and to attempt miniaturization of the spectrometer. Further, even when reflected light is generated in the light detection part, the reflected light may be inhibited from reaching the light detection part again by a region around the depression on the first surface of the base wall part.

In the spectrometer in accordance with one aspect of the present invention, the second end part of the wiring may be positioned in a region around the depression on the second surface of the base wall part when viewed in a thickness direction of the base wall part. According to this configuration, it is possible to inhibit the dispersive part from being deformed due to an external force acting on the second end part of the wiring.

The spectrometer in accordance with one aspect of the present invention may further include a first reflection part provided in the support and configured to reflect the light passing through the light passing part in the space, and a second reflection part provided in the light detection element and configured to reflect the light reflected by the first reflection part to the dispersive part in the space. According to this configuration, an incident direction of the light entering the dispersive part and a divergence or convergence state of the light may be easily adjusted. Thus, even when the length of the optical path from the dispersive part to the light detection part is made short, the light dispersed by the dispersive part may be accurately concentrated on a predetermined position of the light detection part.

In the spectrometer in accordance with one aspect of the present invention, the first end part of the wiring may be connected to the terminal of the light detection element in a fixed part of the light detection element and the support. According to this configuration, the electrical connection between the light detection part and the wiring may be secured.

In the spectrometer in accordance with one aspect of the present invention, a material of the support may be ceramic. According to this configuration, it is possible to suppress expansion and contraction of the support resulting from a temperature change of an environment in which the spectrometer is used, etc. Therefore, it is possible to more reliably suppress a decrease in detection accuracy (a shift of a peak wavelength in light detected by the light detection part, etc.) resulting from occurrence of a variance in a positional relationship between the dispersive part and the light detection part.

In the spectrometer in accordance with one aspect of the present invention, the space may be airtightly sealed by a package including the light detection element and the support as components. According to this configuration, it is possible to suppress a decrease in detection accuracy resulting from deterioration of a member in the space due to moisture, occurrence of condensation in the space due to a decrease in ambient temperature, etc.

In the spectrometer in accordance with one aspect of the present invention, the space may be airtightly sealed by a package accommodating the light detection element and the support. According to this configuration, it is possible to suppress a decrease in detection accuracy resulting from deterioration of a member in the space due to moisture, occurrence of condensation in the space due to a decrease in ambient temperature, etc.

The method for manufacturing a spectrometer in accordance with one aspect of the present invention includes a first step of preparing a support provided with a wiring and a dispersive part, a second step of preparing a light detection element provided with a substrate made of a semiconductor material, a light passing part provided in the substrate, and a light detection part put in the substrate, and a third step of fixing the support and the light detection element such that a space is formed after the first step and the second step, thereby forming, in the space, an optical path on which light passing through the light passing part is dispersed and reflected by the dispersive part, and the light dispersed and reflected by the dispersive part enters the light detection part, and electrically connecting the wiring to the light detection part.

In the method for manufacturing the spectrometer in accordance with one aspect of the present invention, the optical path from the light passing part to the light detection part is formed in the space, and the wiring is electrically connected to the light detection part only by fixing the support provided with the wiring and the dispersive part to the light detection element provided with the light passing part and the light detection part. Therefore, according to the method for manufacturing the spectrometer, it is possible to easily produce the spectrometer which can attempt miniaturization while suppressing a decrease in detection accuracy. The first step and the second step may be implemented in an arbitrary order.

Advantageous Effects of Invention

The present invention can provide a spectrometer which can attempt miniaturization while suppressing a decrease in detection accuracy, and a method for manufacturing a spectrometer capable of easily manufacturing such a spectrometer.

DESCRIPTION OF EMBODIMENTS

Figure 1:
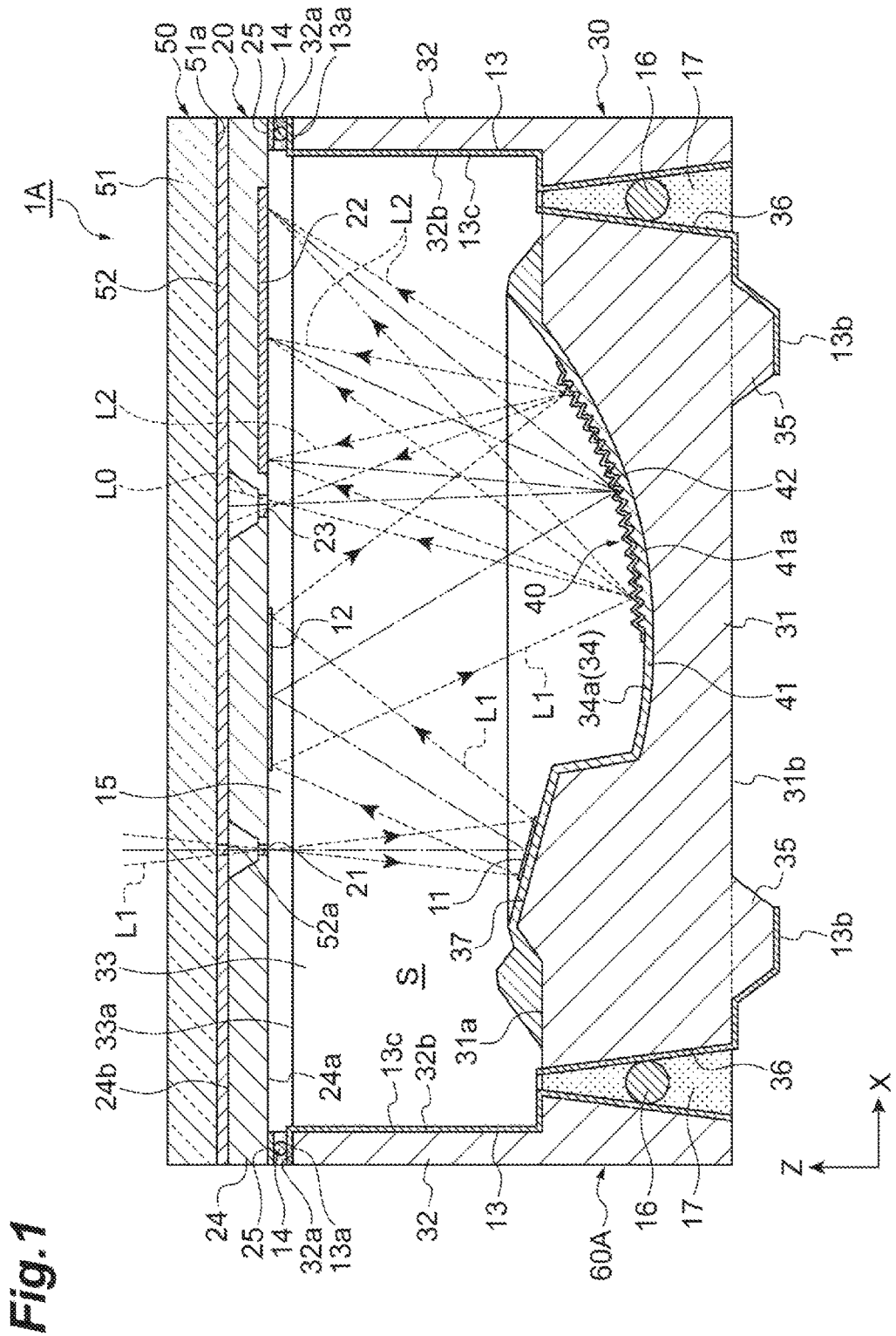
FIG. 1 is a cross-sectional view of a spectrometer in accordance with a first embodiment of the invention.

In the following, preferred embodiments of the present invention will be explained in detail with reference to the drawings. In the drawings, the same or equivalent parts will be referred to with the same signs while omitting their overlapping descriptions.

First Embodiment

Figure 2:
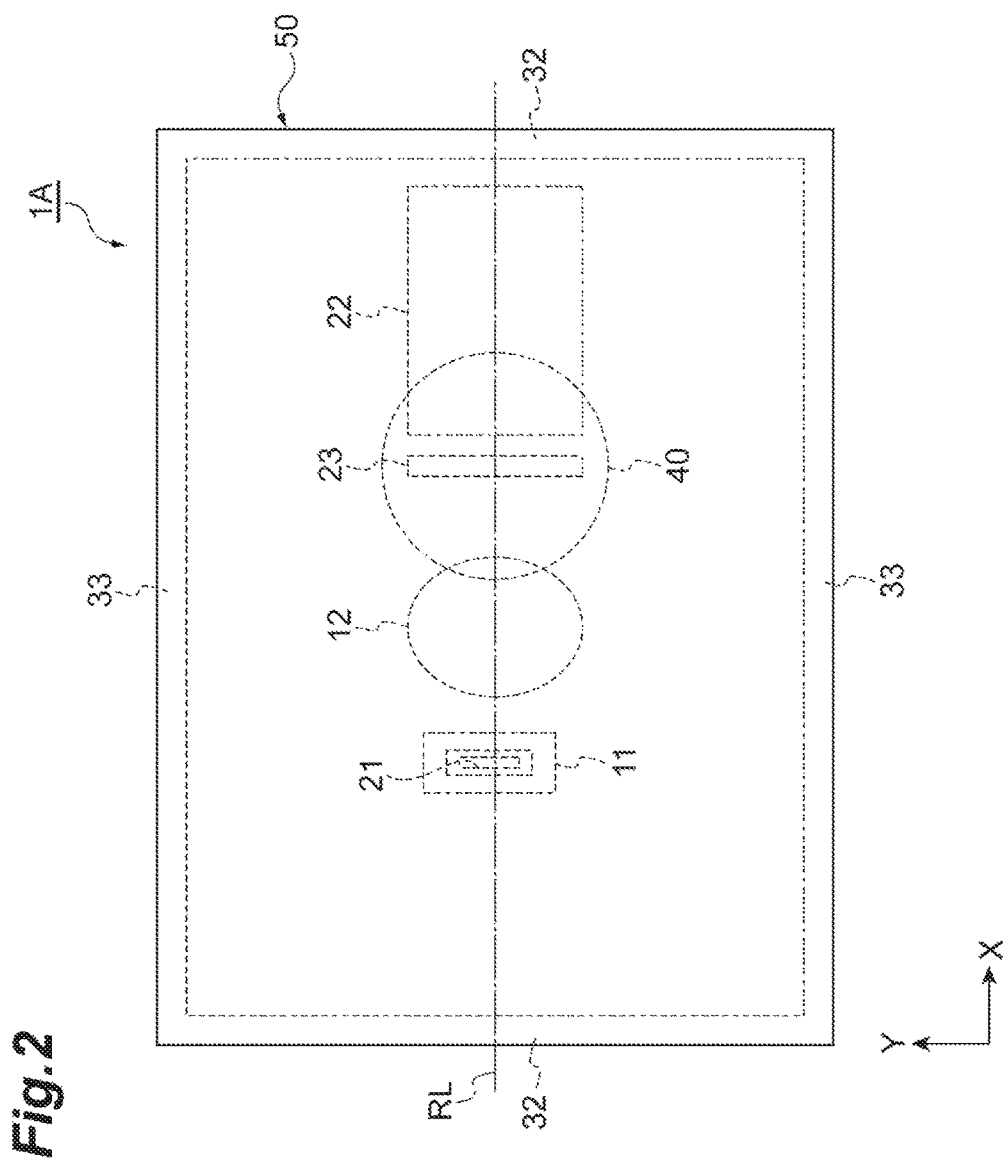
FIG. 2 is a plan view of the spectrometer in accordance with the first embodiment of the invention.

As illustrated in FIGS. 1 and 2, a spectrometer 1A includes a light detection element 20, a support 30, a first reflection part 11, a second reflection part 12, a dispersive part 40, and a cover 50. The light detection element 20 is provided with a light passing part 21, a light detection part 22, and a zero-order light capture part 23. The support 30 is provided with a wiring 13 for inputting/outputting electric signals to/from the light detection part 22. The support 30 is fixed to the light detection element 20 such that a space S is formed among the light passing part 21, the light detection part 22, and the zero-order light capture part 23. For example, the spectrometer 1A is formed in a shape of a rectangular parallelepiped, a length of which in each of an X-axis direction, a Y-axis direction, and a Z-axis direction is less than or equal to 10 mm. The wiring 13 and the support 30 are configured as a molded interconnect device (MID).

The light passing part 21, the first reflection part 11, the second reflection part 12, the dispersive part 40, the light detection part 22, and the zero-order light capture part 23 are arranged side by side along a reference line RL that extends in the X-axis direction when viewed in an optical axis direction (that is, the Z-axis direction) of light L1 passing through the light passing part 21. In the spectrometer 1A, the light L1 passing through the light passing part 21 is reflected by the first reflection part 11 and the second reflection part 12 in sequence, enters the dispersive part 40, and is dispersed and reflected in the dispersive part 40. Then, light L2 other than zero-order light L0 in light dispersed and reflected in the dispersive part 40 enters the light detection part 22 and is detected by the light detection part 22. The zero-order light L0 in the light dispersed and reflected in the dispersive part 40 enters the zero-order light capture part 23 and is captured by the zero-order light capture part 23. An optical path of the light L1 from the light passing part 21 to the dispersive part 40, an optical path of the light L2 from the dispersive part 40 to the light detection part 22, and an optical path of the zero-order light L0 from the dispersive part 40 to the zero-order light capture part 23 are formed in the space S.

The light detection element 20 includes a substrate 24. For example, the substrate 24 is formed in a rectangular plate shape using a semiconductor material such as silicone. The light passing part 21 is a slit formed in the substrate 24, and extends in the Y-axis direction. The zero-order light capture part 23 is a slit formed in the substrate 24, and extends in the Y-axis direction between the light passing part 21 and the light detection part 22. In the light passing part 21, an end part on an entrance side of the light L1 widens toward the entrance side of the light L1 in each of the X- and Y-axis directions. In addition, in the zero-order light capture part 23, an end part on the opposite side from an entrance side of the zero-order light L0 widens toward the opposite side from the entrance side of the zero-order light L0 in each of the X- and Y-axis directions. When the zero-order light L0 is configured to obliquely enter the zero-order light capture part 23, the zero-order light L0 entering the zero-order light capture part 23 may be more reliably inhibited from returning to the space S.

The light detection part 22 is provided on a surface 24a of the substrate 24 on the space S side. More specifically, the light detection part 22 is put in the substrate 24 made of the semiconductor material rather than being attached to the substrate 24. That is, the light detection part 22 includes a plurality of photodiodes formed in a first conductivity type region inside the substrate 24 made of the semiconductor material and a second conductivity type region provided within the region. For example, the light detection part 22 is configured as a photodiode array, a C-MOS image sensor, a CCD image sensor, etc., and has a plurality of light detection channels arranged along the reference line RL. Lights L2 having different wavelengths are let into the respective light detection channels of the light detection part 22. A plurality of terminals 25 for inputting/outputting electric signals to/from the light detection part 22 is provided on the surface 24a of the substrate 24. The light detection part 22 may be configured as a surface-incident photodiode or a back surface-incident photodiode. For example, when the light detection part 22 is configured as the surface-incident photodiode, the light detection part 22 is positioned at the same height as that of a light exit of the light passing part 21 (that is, the surface 24a of the substrate 24 on the space S side). In addition, for example, when the light detection part 22 is configured as the back surface-incident photodiode, the light detection part 22 is positioned at the same height as that of a light entrance of the light passing part 21 (that is, a surface 24b of the substrate 24 on the opposite side from the space S side).

The support 30 has a base wall part 31, a pair of side wall parts 32, and a pair of side wall parts 33. The base wall part 31 opposes the light detection element 20 in the Z-axis direction through the space S. A depression 34 open to the space S side, a plurality of projections 35 protruding to the opposite side from the space S side, and a plurality of through holes 36 open to the space S side and the opposite side from the space S side are formed in the base wall part 31. The pair of side wall parts 32 opposes each other in the X-axis direction through the space S. The pair of side wall parts 33 opposes each other in the Y-axis direction through the space S. The base wall part 31, the pair of side wall parts 32, and the pair of side wall parts 33 are integrally formed using ceramic such as AlN or $Al_2O_3$.

The first reflection part 11 is provided in the support 30. More specifically, the first reflection part 11 is provided on a flat inclined surface 37 inclined at a predetermined angle in a surface (first surface) 31a of the base wall part 31 on the space S side with a molded layer 41 interposed therebetween. For example, the first reflection part 11 is a planar mirror including a metal evaporated film of Al, Au, etc. and having a mirror surface. The first reflection part 11 reflects the light L1 passing through the light passing part 21 to the second reflection part 12 in the space S. The first reflection part 11 may be directly formed on the inclined surface 37 of the support 30 without the molded layer 41 interposed therebetween.

The second reflection part 12 is provided in the light detection element 20. More specifically, the second reflection part 12 is provided in a region between the light passing part 21 and the zero-order light capture part 23 on the surface 24a of the substrate 24. For example, the second reflection part 12 is a planar mirror including a metal evaporated film of Al, Au, etc. and having a mirror surface. The second reflection part 12 reflects the light L1, which is reflected by the first reflection part 11, to the dispersive part 40 in the space S.

The dispersive part 40 is provided in the support 30. Details thereof are described below. That is, the molded layer 41 is disposed to cover the depression 34 on the surface 31a of the base wall part 31. The molded layer 41 is formed into a film along an inner surface 34a of the depression 34. For example, a grating pattern 41a corresponding to a blazed grating having a serrated cross section, a binary grating having a rectangular cross section, a holographic grating having a sinusoidal cross section, etc. is formed in a predetermined region of the molded layer 41 corresponding to a spherical region on the inner surface 34a. For example, a reflecting film 42 including a metal evaporated film of Al, Au, etc. is formed on the molded layer 41 to cover the grating pattern 41a. The reflecting film 42 is formed along a shape of the grating pattern 41a. A surface of the reflecting film 42, which is formed along the shape of the grating pattern 41a, on the space S side serves as the dispersive part 40 in the form of a reflection grating. The molded layer 41 is formed by pressing a mold die against a molding material (e.g., photocuring epoxy resins, acrylic resins, fluorine-based resins, silicone, and replica optical resins such as organic/inorganic hybrid resins) and curing the molding material (by photocuring or thermal curing using UV light, etc.) in this state.

As described in the foregoing, the dispersive part 40 is provided on the inner surface 34a of the depression 34 in the surface 31a of the base wall part 31. The dispersive part 40 has a plurality of grating grooves arranged along the reference line RL, and disperses and reflects the light L1, which is reflected by the second reflection part 12, to the light detection part 22 in the space S. The dispersive part 40 is not restricted to a dispersive part directly formed in the support 30 as described above. For example, the dispersive part 40 may be provided in the support 30 by attaching a dispersive element, which has the dispersive part 40 and a substrate on which the dispersive part 40 is formed, to the support 30.

Each wiring 13 has an end part (first end part) 13a on the light detection part 22 side, an end part (second end part) 13b on the opposite side from the light detection part 22 side, and a connection part 13c. The end part 13a of each wiring 13 is positioned on an end surface 32a of each side wall part 32 to oppose each terminal 25 of the light detection element 20. The end part 13b of each wiring 13 is positioned on a surface of each projection 35 in a surface (second surface) 31b on the opposite side from the space S side in the base wall part 31. The connection part 13c of each wiring 13 reaches the end part 13b from the end part 13a on a surface 32b of each side wall part 32 on the space S side, the surface 31a of the base wall part 31, and an inner surface of each through hole 36. In this way, when the wiring 13 encloses a surface of the support 30 on the space S side, deterioration of the wiring 13 may be prevented.

For example, the terminal 25 of the light detection element 20 and the end part 13a of the wiring 13 opposing each other are connected to each other by a bump 14 made of Au, solder, etc. In the spectrometer 1A, the support 30 is fixed to the light detection element 20, and a plurality of wirings 13 is electrically connected to the light detection part 22 of the light detection element 20 by a plurality of bumps 14. In this way, the end part 13a of each wiring 13 is connected to each terminal 25 of the light detection element 20 in a fixed part of the light detection element 20 and the support 30.

The cover 50 is fixed to the surface 24b of the substrate 24 of the light detection element 20 on the opposite side from the space S side. The cover 50 has a light transmitting member 51 and a light shielding film 52. For example, the light transmitting member 51 is forming in a rectangular plate shape using a material which transmits the light L1 therethrough, examples of which include silica, borosilicate glass (BK7), Pyrex (registered trademark) glass, and Kovar glass. The light shielding film 52 is formed on a surface 51a of the light transmitting member 51 on the space S side. A light transmitting opening 52a is formed in the light shielding film 52 to oppose the light passing part 21 of the light detection element 20 in the Z-axis direction. The light transmitting opening 52a is a slit formed in the light shielding film 52, and extends in the Y-axis direction. In the spectrometer 1A, an entrance NA of the light L1 that enters the space S is defined by the light transmitting opening 52a of the light shielding film 52 and the light passing part 21 of the light detection element 20.

When an infrared ray is detected, silicon, germanium, etc. is effective as a material of the light transmitting member 51. In addition, the light transmitting member 51 may be provided with an AR (Anti Reflection) coat, and may have such a filter function as to transmit therethrough only a predetermined wavelength of light. Further, for example, a black resist, Al, etc. may be used as a material of the light shielding film 52. Here, the black resist is effective as the material of the light shielding film 52 from a viewpoint that the zero-order light L0 entering the zero-order light capture part 23 is inhibited from returning to the space S.

For example, a sealing member 15 made of resin, etc. is disposed among the surface 24a of the substrate 24, the end surface 32a of each side wall part 32, and the end surface 33a of each side wall part 33. In addition, for example, a sealing member 16 made of glass beads, etc. is disposed inside the through hole 36 of the base wall part 31, and the inside of the through hole 36 is filled with a sealing member 17 made of resin. In the spectrometer 1A, the space S is airtightly sealed by a package 60A that includes the light detection element 20, the support 30, the cover 50, and the sealing members 15, 16, and 17 as components. When the spectrometer 1A is mounted on an external circuit board, the end part 13b of each wiring 13 functions as an electrode pad. The light passing part 21 and the zero-order light capture part 23 of the substrate 24 may be airtightly sealed by filling the light passing part 21 and the zero-order light capture part 23 of the substrate 24 with light transmitting resin in place of disposing the cover 50 on the surface 24b of the substrate 24. In addition, for example, the inside of the through hole 36 of the base wall part 31 may be filled with only the sealing member 17 made of the resin without disposing the sealing member 16 made of the glass beads, etc.

As described in the foregoing, in the spectrometer 1A, an optical path from the light passing part 21 to the light detection part 22 is formed inside the space S which is formed by the light detection element 20 and the support 30. In this way, miniaturization of the spectrometer 1A may be attempted. Further, the wiring 13 electrically connected to the light detection part 22 is provided in the support 30, and the end part 13b of the wiring 13 on the opposite side from the light detection part 22 side is positioned on the surface 31b of the base wall part 31 on the opposite side from the space S. In this way, even when an external force acts on the end part 13b of the wiring 13, the support 30 is rarely distorted. Thus, it is possible to suppress a decrease in detection accuracy (a shift of a peak wavelength in light detected by the light detection part 22, etc.) resulting from occurrence of a variance in a positional relationship between the dispersive part 40 and the light detection part 22. In addition, the end part 13b of the wiring 13 is formed on the surface 31b of the base wall part 31, and thus an external force may be inhibited from acting on the light detection element 20 at the time of mounting, and damage to the light detection element 20 may be reduced when compared to a conventional art in which a circuit board is directly connected to the light detection element 20. Therefore, the spectrometer 1A may attempt miniaturization while suppressing a decrease in detection accuracy.

In addition, in the spectrometer 1A, the depression 34 open to the space S side is formed in the base wall part 31, and the dispersive part 40 is provided on the inner surface 34a of the depression 34. In this way, it is possible to obtain the highly reliable dispersive part 40, and to attempt miniaturization of the spectrometer 1A. Further, even when reflected light is generated in the light detection part 22, the reflected light may be inhibited from reaching the light detection part 22 again by a region around the depression 34 on the surface 31a of the base wall part 31. Furthermore, even when an external force acts on the support 30, an impact may be inhibited from being directly applied to the dispersive part 40 by the region around the depression 34 on the surface 31a of the base wall part 31.

In addition, in the spectrometer 1A, the first reflection part 11 that reflects the light L1 passing through the light passing part 21 is provided in the support 30, and the second reflection part 12 that reflects the light L1, which is reflected by the first reflection part 11, to the dispersive part 40 is provided in the light detection element 20. In this way, an incident direction of the light L1 entering the dispersive part 40 and a divergence or convergence state of the light L1 may be easily adjusted. Thus, even when the length of the optical path from the dispersive part 40 to the light detection part 22 is made short, the light L2 dispersed by the dispersive part 40 may be accurately concentrated on a predetermined position of the light detection part 22.

In addition, in the spectrometer 1A, the end part 13a of the wiring 13 is connected to the terminal 25 of the light detection element 20 in the fixed part of the light detection element 20 and the support 30. In this way, the electrical connection between the light detection part 22 and the wiring 13 may be secured.

In addition, in the spectrometer 1A, a material of the support 30 is ceramic. In this way, it is possible to suppress expansion and contraction of the support 30 resulting from a temperature change of an environment in which the spectrometer 1A is used, generation of heat in the light detection part 22, etc. Therefore, it is possible to suppress a decrease in detection accuracy (a shift of a peak wavelength in light detected by the light detection part 22, etc.) resulting from occurrence of a variance in a positional relationship between the dispersive part 40 and the light detection part 22. Since the spectrometer 1A is miniaturized, there is concern that a slight change in an optical path may greatly affect an optical system, leading to a decrease in detection accuracy. For this reason, in particular, as described in the foregoing, when the dispersive part 40 is directly formed in the support 30, it is significantly important to suppress expansion and contraction of the support 30.

In addition, in the spectrometer 1A, the first reflection part 11 serves as the planar mirror. In this way, when the entrance NA of the light L1 passing through the light passing part 21 is made small, and an inequality of "the optical path length, from the light passing part 21 to the dispersive part 40, of the light L1 having the same spread angle as a spread angle of the light L1 passing through the light passing part 21">"the optical path length from the dispersive part 40 to the light detection part 22" is satisfied (optical reduction system), resolving power of the light L2 dispersed by the dispersive part 40 may be increased. Details thereof are described below. That is, when the first reflection part 11 is a planar mirror, the dispersive part 40 is irradiated with the light L1 while the light L1 spreads. For this reason, the entrance NA of the light L1 passing through the light passing part 21 needs to be made small from a viewpoint that a region of the dispersive part 40 is inhibited from widening and a viewpoint that a length at which the dispersive part 40 concentrates the light L2 on the light detection part 22 is inhibited from becoming longer. Therefore, resolving power of the light L2 dispersed by the dispersive part 40 may be increased by reducing the entrance NA of the light L1 and setting an optical reduction system.

In addition, in the spectrometer 1A, the space S is airtightly sealed by the package 60A that includes the light detection element 20 and the support 30 as components. In this way, it is possible to suppress a decrease in detection accuracy resulting from deterioration of a member in the space S due to moisture, occurrence of condensation in the space S due to a decrease in ambient temperature, etc.

In addition, in the spectrometer 1A, the second reflection part 12 is provided in the light detection element 20. In the light detection element 20, the surface 24a of the substrate 24 on which the second reflection part 12 is formed is a flat surface. Further, the second reflection part 12 may be formed in a step of manufacturing the light detection element 20. Thus, the second reflection part 12 according to a desired NA may be accurately formed by controlling a shape, an area, etc. of the second reflection part 12.

In addition, in the spectrometer 1A, a flat region (which may be slightly inclined) is present around the depression 34 on the surface 31a of the base wall part 31. In this way, even when reflected light is generated in the light detection part 22, the reflected light may be inhibited from reaching the light detection part 22 again. Further, when the molded layer 41 is formed on the inner surface 34a of the depression 34 by pressing a mold die against resin, and when the sealing member 15 made of resin is disposed among the surface 24a of the substrate 24, the end surface 32a of each side wall part 32, and the end surface 33a of each side wall part 33, the flat region serves as a shelter for surplus resin. In this instance, when the surplus resin is allowed to flow into the through hole 36 of the base wall part 31, for example, the sealing member 16 made of the glass beads, etc. is unnecessary, and the resin functions as the sealing member 17.

In addition, in a step of manufacturing the spectrometer 1A, as described in the foregoing, the molded layer 41, which is smooth, is formed on the inclined surface 37 of the base wall part 31 using a mold die, and the first reflection part 11 is formed on the molded layer 41. Normally, a surface of the molded layer 41 is less uneven and smoother than a surface of the support 30, and thus the first reflection part 11 having the mirror surface may be more accurately formed. However, when the first reflection part 11 is directly formed on the inclined surface 37 of the base wall part 31 without the molded layer 41 interposed therebetween, a molding material used for the molded layer 41 may be reduced, and a shape of the mold die may be simplified. Thus, the molded layer 41 may be easily formed.

In addition, in the spectrometer 1A, the light passing part 21, the first reflection part 11, the second reflection part 12, the dispersive part 40, and the light detection part 22 are arranged along the reference line RL when viewed from the optical axis direction of the light L1 passing through the light passing part 21. Further, the dispersive part 40 has the plurality of grating grooves arranged along the reference line RL, and the light detection part 22 has the plurality of light detection channels arranged along the reference line RL. In this way, the light L2 dispersed by the dispersive part 40 may be more accurately concentrated on each of the light detection channels of the light detection part 22.

Figure 3:
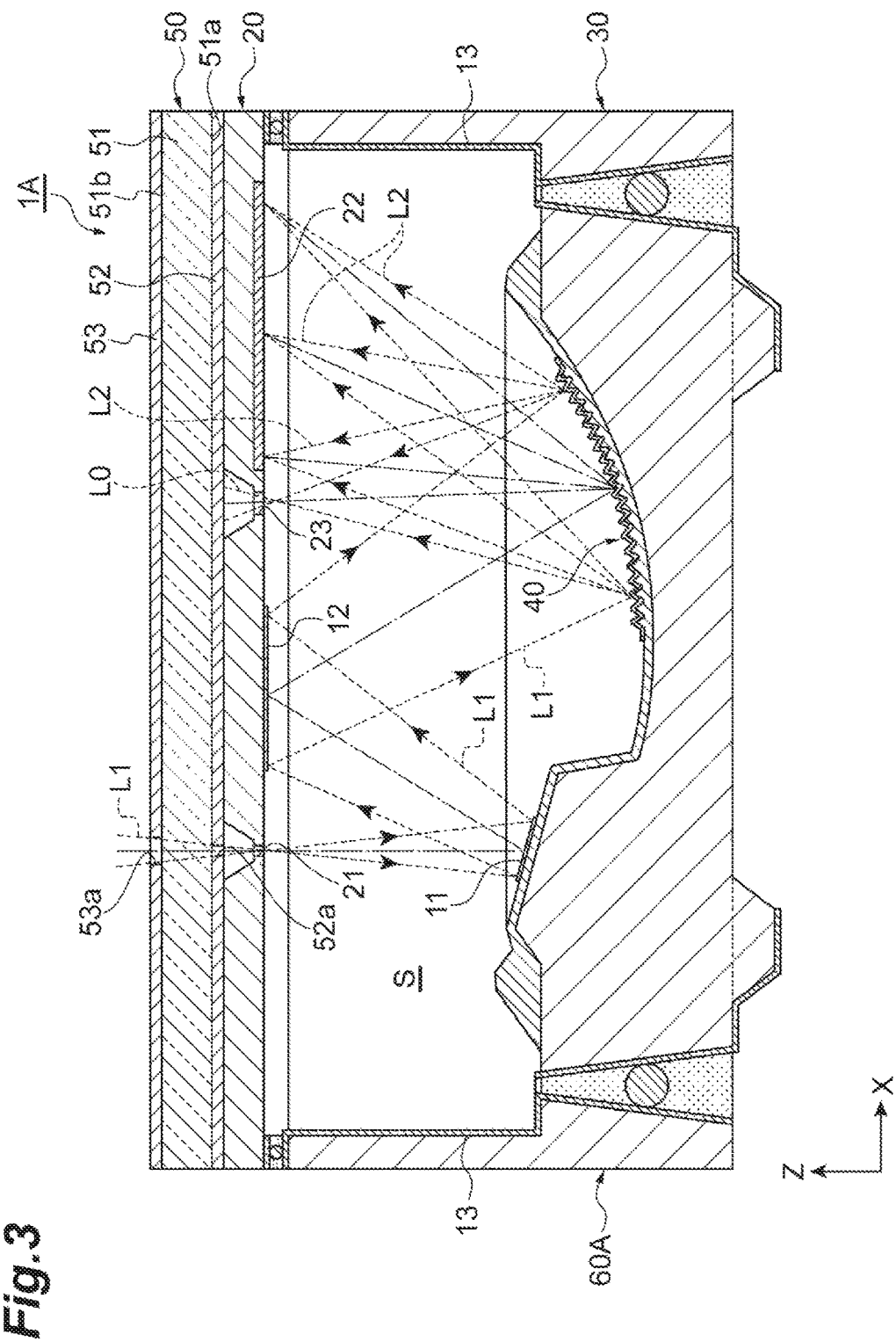
FIG. 3 is a cross-sectional view of a modified example of the spectrometer in accordance with the first embodiment of the invention.

As illustrated in FIG. 3, for example, the cover 50 may further include a light shielding film 53 made of a black resist, Al, etc. The light shielding film 53 is formed on a surface 51b on the opposite side from the space S side in the light transmitting member 51. A light transmitting opening 53a is formed in the light shielding film 53 to oppose the light passing part 21 of the light detection element 20 in the Z-axis direction. The light transmitting opening 53a is a slit formed in the light shielding film 53, and extends in the Y-axis direction. In this case, the entrance NA of the light L1 entering the space S may be more accurately defined using the light transmitting opening 53a of the light shielding film 53, the light transmitting opening 52a of the light shielding film 52, and the light passing part 21 of the light detection element 20.

Figure 4:
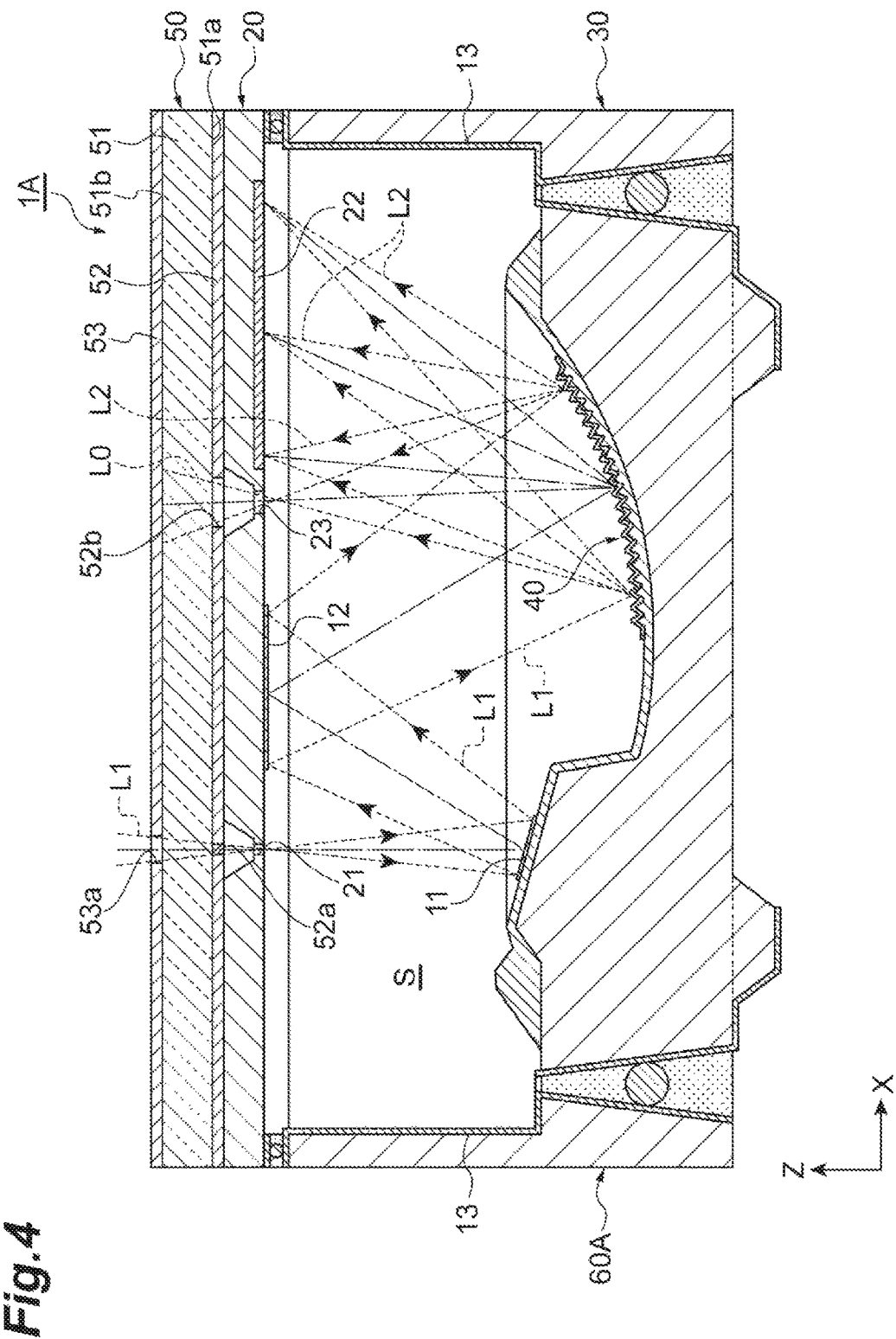
FIG. 4 is a cross-sectional view of the modified example of the spectrometer in accordance with the first embodiment of the invention.

In addition, as illustrated in FIG. 4, the cover 50 may further include the above-described light shielding film 53, and a light transmitting opening 52b may be formed in the light shielding film 52 to oppose the zero-order light capture part 23 of the light detection element 20 in the Z-axis direction. In this case, it is possible to more reliably inhibit the zero-order light L0 entering the zero-order light capture part 23 from returning to the space S.

In addition, when the spectrometer 1A is produced, the support 30 provided with the wiring 13, the first reflection part 11, and the dispersive part 40 is prepared (first step), the light detection element 20 provided with the light passing part 21, the second reflection part 12, and the light detection part 22 is prepared (second step), and then the optical path from the light passing part 21 to the light detection part 22 is formed in the space S, and the wiring 13 is electrically connected to the light detection part 22 by fixing the support 30 to the light detection element 20 such that the space S is formed (third step). As described above, the optical path from the light passing part 21 to the light detection part 22 is formed in the space S, and the wiring 13 is electrically connected to the light detection part 22 only by fixing the support 30 to the light detection element 20. Therefore, according to a method for manufacturing the spectrometer 1A, it is possible to easily produce the spectrometer 1A which can attempt miniaturization while suppressing a decrease in detection accuracy. The step of preparing the support 30 and the step of preparing the light detection element 20 may be implemented in an arbitrary order.

In particular, when the spectrometer 1A is produced, in addition to the electrical connection between the wiring 13 and the light detection part 22, fixing of the support 30 to the light detection element 20 and formation of the optical path from the light passing part 21 to the light detection part 22 are implemented only by connecting the end part 13a of the wiring 13 provided in the support 30 to the terminal 25 of the light detection element 20.

Second Embodiment

Figure 5:
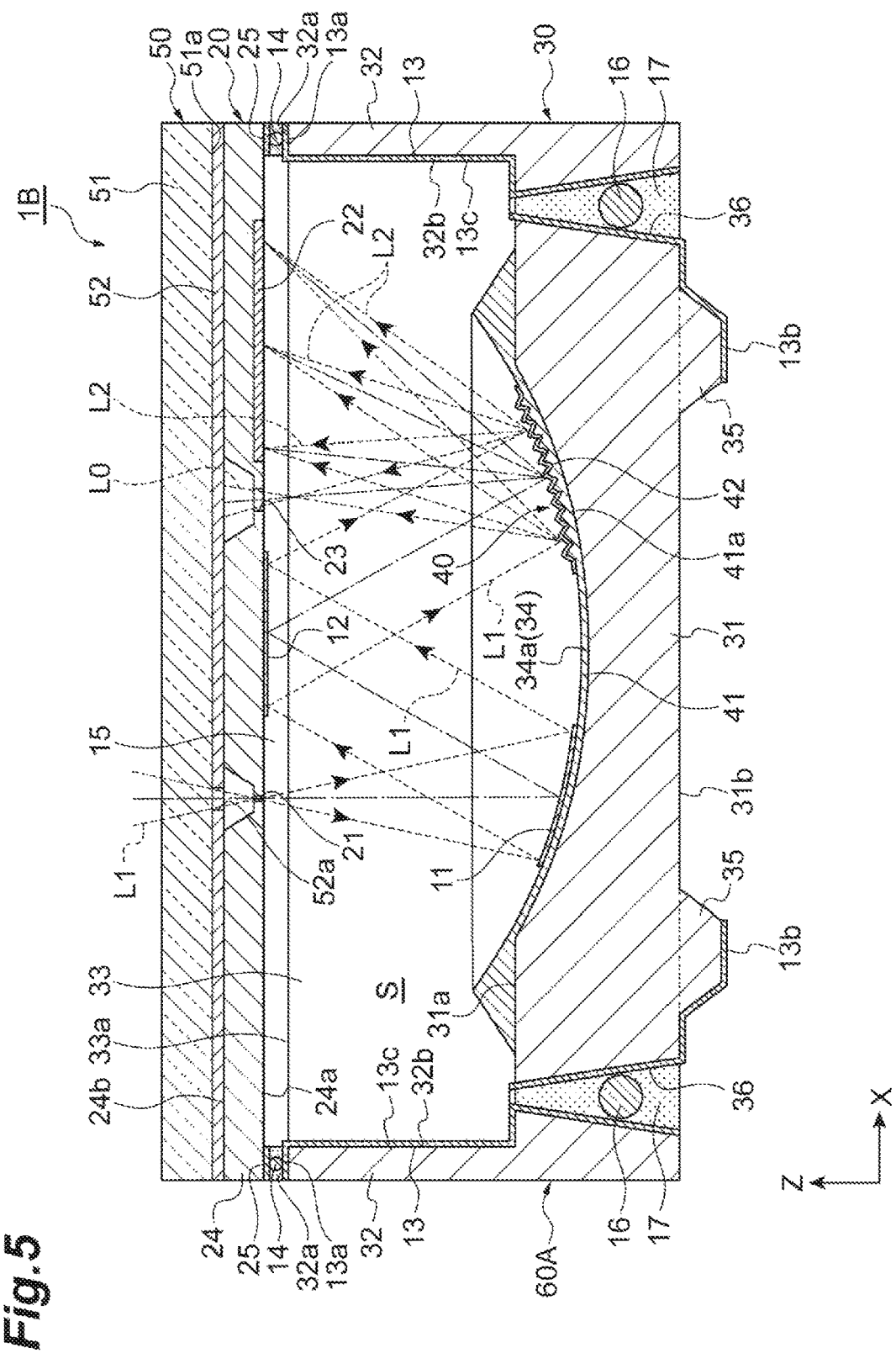
FIG. 5 is a cross-sectional view of a spectrometer in accordance with a second embodiment of the invention.
Figure 6:
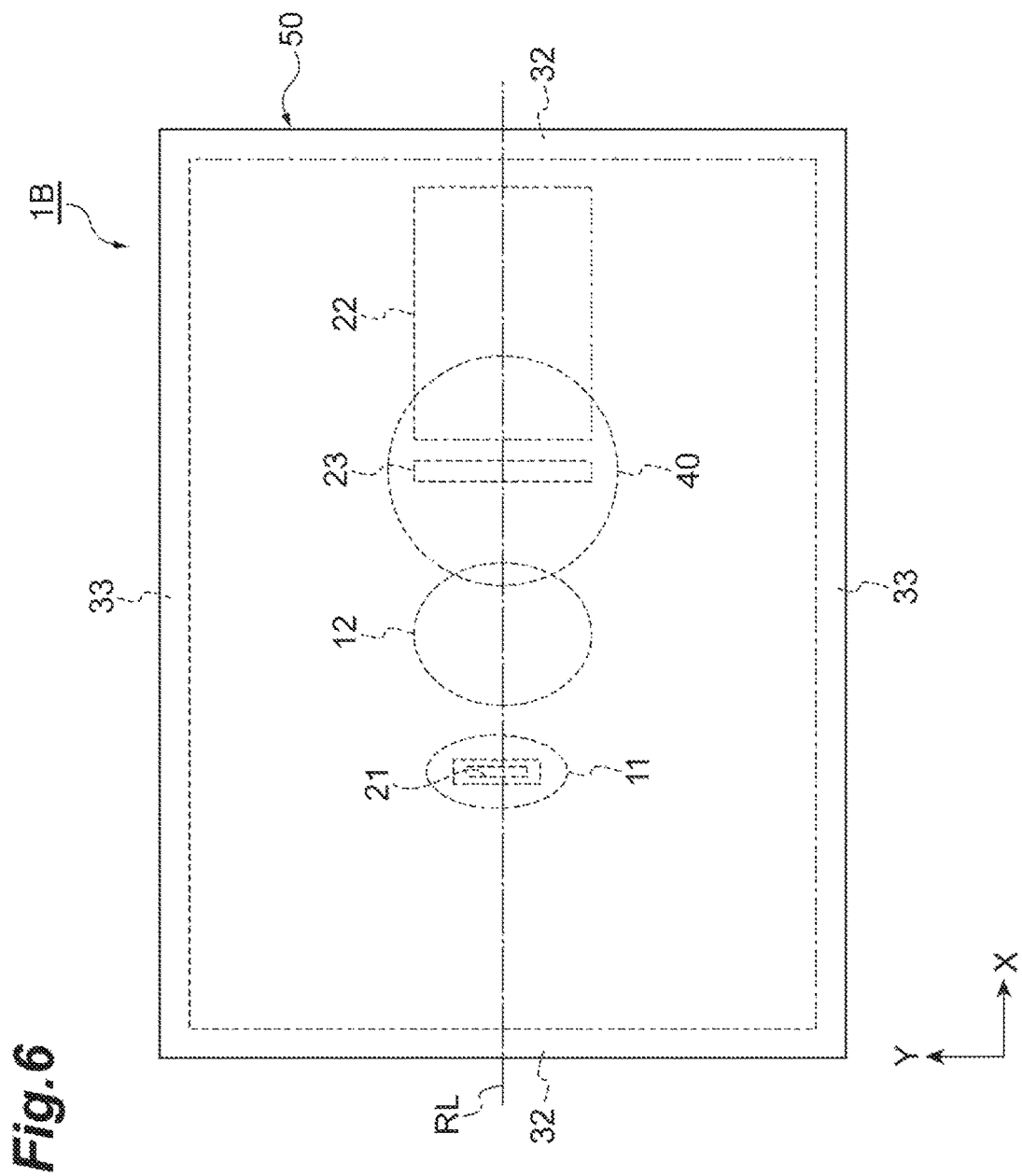
FIG. 6 is a plan view of the spectrometer in accordance with the second embodiment of the invention.

As illustrated in FIGS. 5 and 6, a spectrometer 1B is mainly different from the above-described spectrometer 1A in that a first reflection part 11 is a concave mirror. In the spectrometer 1B, the first reflection part 11 is provided in a spherical region on an inner surface 34a of a depression 34 of a base wall part 31 with a molded layer 41 interposed therebetween. For example, the first reflection part 11 is a concave mirror which is made of a metal evaporated film of Al, Au, etc. and has a mirror surface, and reflects light L1 passing through a light passing part 21 to a second reflection part 12 in a space S. The first reflection part 11 may be directly formed on the inner surface 34a of the depression 34 in a support 30 without the molded layer 41 interposed therebetween. In addition, a cover 50 may have a configuration illustrated in FIG. 3 and FIG. 4.

According to the spectrometer 1B configured as described above, it is possible to attempt miniaturization while suppressing a decrease in detection accuracy due to a similar reason to that in the above-described spectrometer 1A. Further, in the spectrometer 1B, the first reflection part 11 is the concave mirror. In this way, a spread angle of the light L1 is suppressed by the first reflection part 11, and thus the entrance NA of the light L1 passing through a light passing part 21 may be increased to increase sensitivity, and the length of an optical path from a dispersive part 40 to a light detection part 22 may be further decreased to further miniaturize the spectrometer 1B. Details thereof are described below. That is, when the first reflection part 11 is the concave mirror, the dispersive part 40 is irradiated with the light L1 while the light L1 is approximately collimated. For this reason, a distance at which the dispersive part 40 concentrates light L2 on the light detection part 22 is short when compared to a case in which the dispersive part 40 is irradiated with the light L1 while the light L spreads. Therefore, the entrance NA of the light L1 may be increased to increase sensitivity, and the optical path length from the dispersive part 40 to the light detection part 22 may be further decreased to further miniaturize the spectrometer 1B.

Third Embodiment

Figure 7:
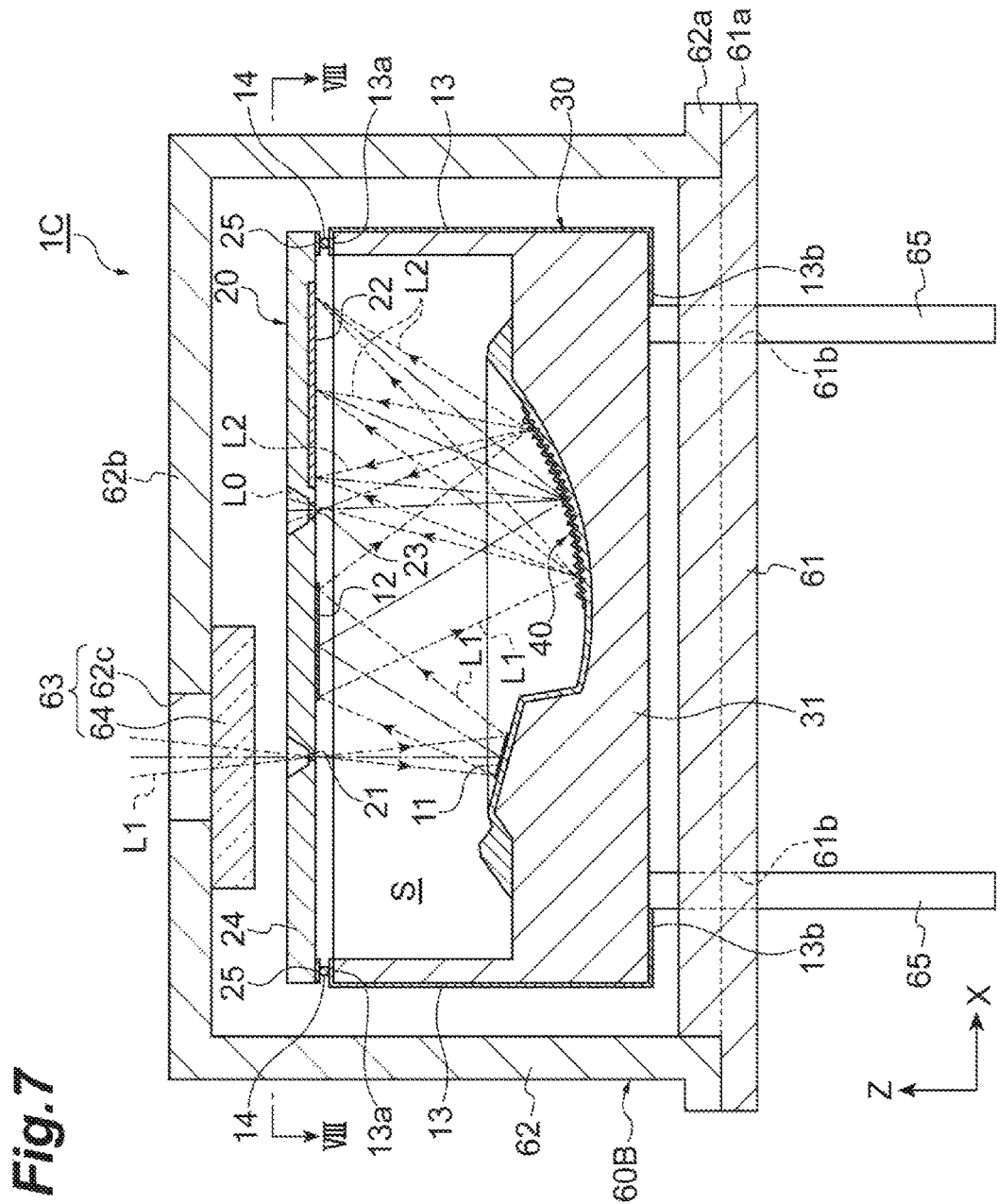
FIG. 7 is a cross-sectional view of a spectrometer in accordance with a third embodiment of the invention.
Figure 8:
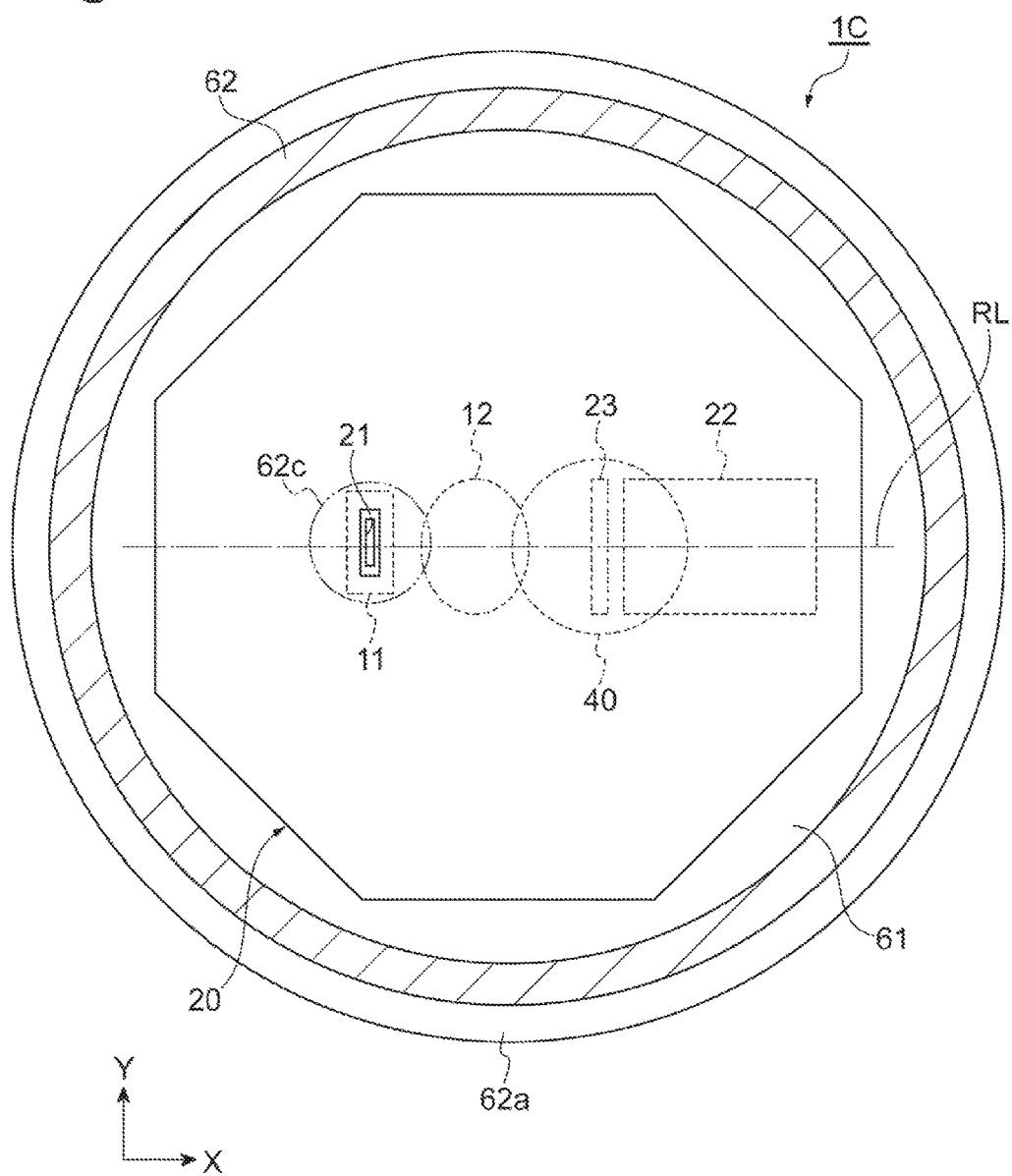
FIG. 8 is a cross-sectional view taken along the line of FIG. 7.

As illustrated in FIGS. 7 and 8, a spectrometer 1C is mainly different from the above-described spectrometer 1A in that a space S is airtightly sealed by a package 60B that accommodates a light detection element 20 and a support 30. The package 60B includes a stem 61 and a cap 62. For example, the stem 61 is formed in a disc shape using metal. For example, the cap 62 is formed in a cylindrical shape using metal. The stem 61 and the cap 62 are airtightly joined to each other while a flange part 61a provided on an outer edge of the stem 61 and a flange part 62a provided at an opening end of the cap 62 are in contact with each other. By way of example, the stem 61 and the cap 62 are airtightly sealed to each other in a nitrogen atmosphere under dew point management (e.g., at −55° C.) or an atmosphere subjected to vacuum drawing.

A light entrance part 63 is provided on a wall part 62b of the cap 62 opposing the stem 61 to oppose a light passing part 21 of a light detection element 20 in a Z-axis direction. The light entrance part 63 is configured by airtightly joining a window member 64 to an inner surface of the wall part 62b to cover a light transmission hole 62c formed in the wall part 62b. The light transmission hole 62c has a shape including the light passing part 21 when viewed in the Z-axis direction. For example, the window member 64 is formed in a plate shape using a material which transmits light L1 therethrough, examples of which include silica, borosilicate glass (BK7), Pyrex (registered trademark) glass, and Kovar glass. In the spectrometer 1C, the light L1 enters the light passing part 21 through the light entrance part 63 from the outside of the package 60B. When an infrared ray is detected, silicon, germanium, etc. is effective as a material of the window member 64. In addition, the window member 64 may be provided with an AR coat, and may have such a filter function as to transmit therethrough only a predetermined wavelength of light. Further, at least a portion of the window member 64 may be disposed inside the light transmission hole 62c such that an outer surface of the window member 64 and an outer surface of the wall part 62b are flush with each other.

A plurality of through holes 61b is formed in the stem 61. Lead pins 65 are inserted into the respective through holes 61b. For example, each of the lead pins 65 is airtightly fixed to each of the through holes 61b through a hex inetic seal made of sealing glass such as low-melting glass having electrically-insulating and light-shielding properties. An end part inside the package 60B in each of the lead pins 65 is connected to an end part 13b of each wiring 13 provided in the support 30 on a surface 31b of a base wall part 31. In this way, electrical connection between the lead pin 65 and the wiring 13 corresponding to each other, and positioning of the light detection element 20 and the support 30 with respect to the package 60B are achieved.

The end part inside the package 60B in the lead pin 65 may be connected to the end part 13b of the wiring 13 extending inside a through hole formed in the base wall part 31 or inside a depression formed on the surface 31b of the base wall part 31 while being disposed inside the through hole or inside the depression. In addition, the end part inside the package 60B in the lead pin 65 and the end part 13b of the wiring 13 may be electrically connected to each other through a circuit board on which the support 30 is mounted by bump bonding, etc. In this case, the end part inside the package 60B in the lead pin 65 may be disposed to surround the support 30 when viewed in a thickness direction of the stem 61 (that is, the Z-axis direction). In addition, the circuit board may be disposed in the stem 61 while touching the stem 61, or may be supported by the plurality of lead pins 65 while being separated from the stem 61.

In the spectrometer 1C, for example, a substrate 24 of the light detection element 20 and the base wall part 31 of the support 30 are formed in hexagonal plate shapes. Further, the light detection element 20 and the support 30 are accommodated in the package 60B. Thus, in the spectrometer 1C, a connection part 13c of each wiring 13 may not be enclosed on a surface 32b of each side wall part 32 on the space S side, a surface 31a of the base wall part 31, and an inner surface of each through hole 36 as in the above-described spectrometer 1A. In the spectrometer 1C, the connection part 13c of each wiring 13 reaches the end part 13b from an end part 13a on a surface of each side wall part 32 on the opposite side from the space S side and the surface 31b of the base wall part 31. In this way, when the wiring 13 is enclosed on a surface of the support 30 on the opposite side from the space S side, scattering of light due to the wiring 13 exposed to the space S may be prevented. Further, in the spectrometer 1C, sealing members 15, 16, and 17 may not be disposed, and a cover 50 may not be provided as in the above-described spectrometer 1A.

According to the spectrometer 1C configured as described above, it is possible to attempt miniaturization while suppressing a decrease in detection accuracy due to a similar reason to that in the above-described spectrometer 1A. In addition, in the spectrometer 1C, the space S is airtightly sealed by the package 60B that accommodates the light detection element 20 and the support 30. In this way, it is possible to suppress a decrease in detection accuracy resulting from deterioration of a member in the space S due to moisture, occurrence of condensation in the space S due to a decrease in ambient temperature, etc.

In addition, in the spectrometer 1C, a gap is formed among an end surface 32a of each side wall part 32 of the support 30, an end surface 33a of each side wall part 33, and a surface 24a of the substrate 24 of the light detection element 20. In this way, deformation of the light detection element 20 rarely affects the support 30, and deformation of the support 30 rarely affects the light detection element 20, and thus an optical path from the light passing part 21 to the light detection part 22 may be accurately maintained.

In addition, in the spectrometer 1C, the support 30 is supported by the plurality of lead pins 65 while being separated from the stein 61. In this way, deformation of the stein 61, an external force from the outside of the package 60B, etc. rarely affect the support 30, and thus the optical path from the light passing part 21 to the light detection part 22 may be accurately maintained.

Fourth Embodiment

Figure 9:
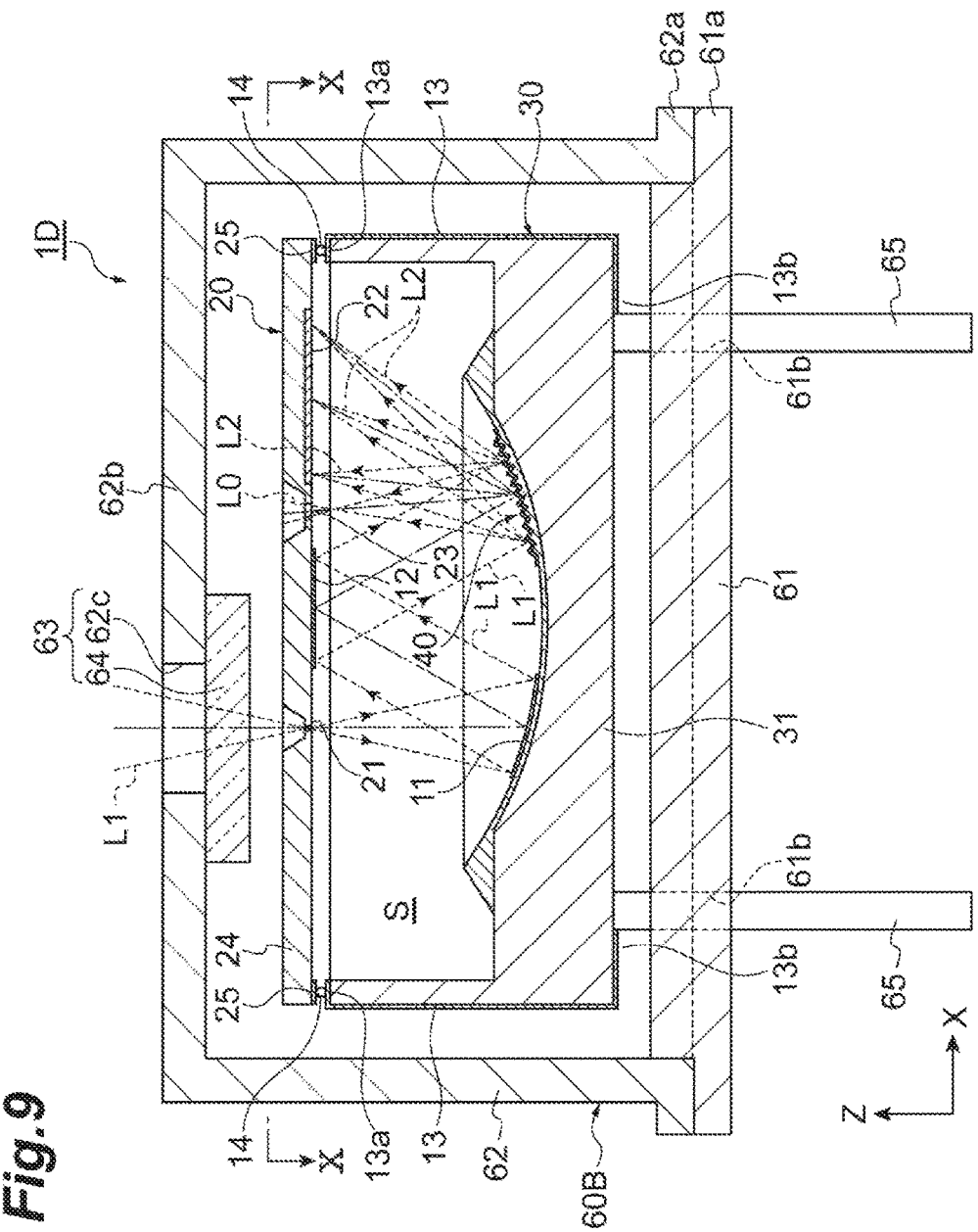
FIG. 9 is a cross-sectional view of a spectrometer in accordance with a fourth embodiment of the invention.
Figure 10:
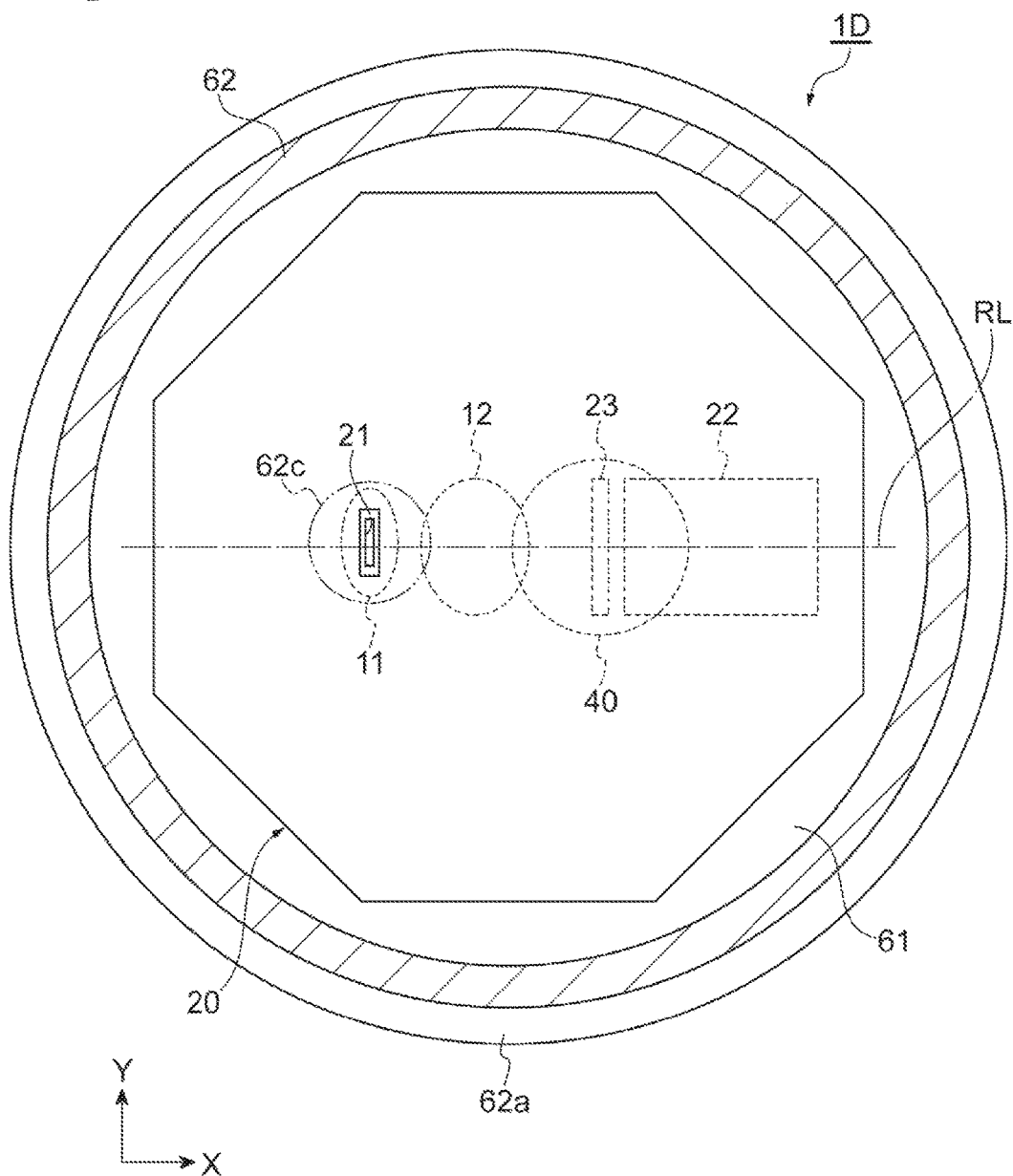
FIG. 10 is a cross-sectional view taken along the line X-X of FIG. 9.

As illustrated in FIGS. 9 and 10, a spectrometer 1D is mainly different from the spectrometer 1C in that a first reflection part 11 is a concave mirror. In the spectrometer 1D, the first reflection part 11 is provided in a spherical region on an inner surface 34a of a depression 34 of a base wall part 31 with a molded layer 41 interposed therebetween. For example, the first reflection part 11 is a concave mirror made of a metal evaporated film of Al, Au, etc., and reflects light L1 passing through a light passing part 21 to a second reflection part 12 in a space S.

According to the spectrometer 1D configured as described above, it is possible to attempt miniaturization while suppressing a decrease in detection accuracy due to a similar reason to that in the above-described spectrometer 1A. Further, in the spectrometer 1D, the first reflection part 11 is the concave mirror. In this way, a spread angle of the light L1 is suppressed by the first reflection part 11, and thus the entrance NA of the light L1 passing through the light passing part 21 may be increased to increase sensitivity, and the length of an optical path from a dispersive part 40 to a light detection part 22 may be further decreased to further miniaturize the spectrometer 1B. In addition, in the spectrometer 1D, the space S is airtightly sealed by a package 60B that accommodates a light detection element 20 and a support 30. In this way, it is possible to suppress a decrease in detection accuracy resulting from deterioration of a member in the space S due to moisture, occurrence of condensation in the space S due to a decrease in ambient temperature, etc.

[Relationship Between Miniaturization of Spectrometer and Radius of Curvature of Dispersive Part]

Figure 11:
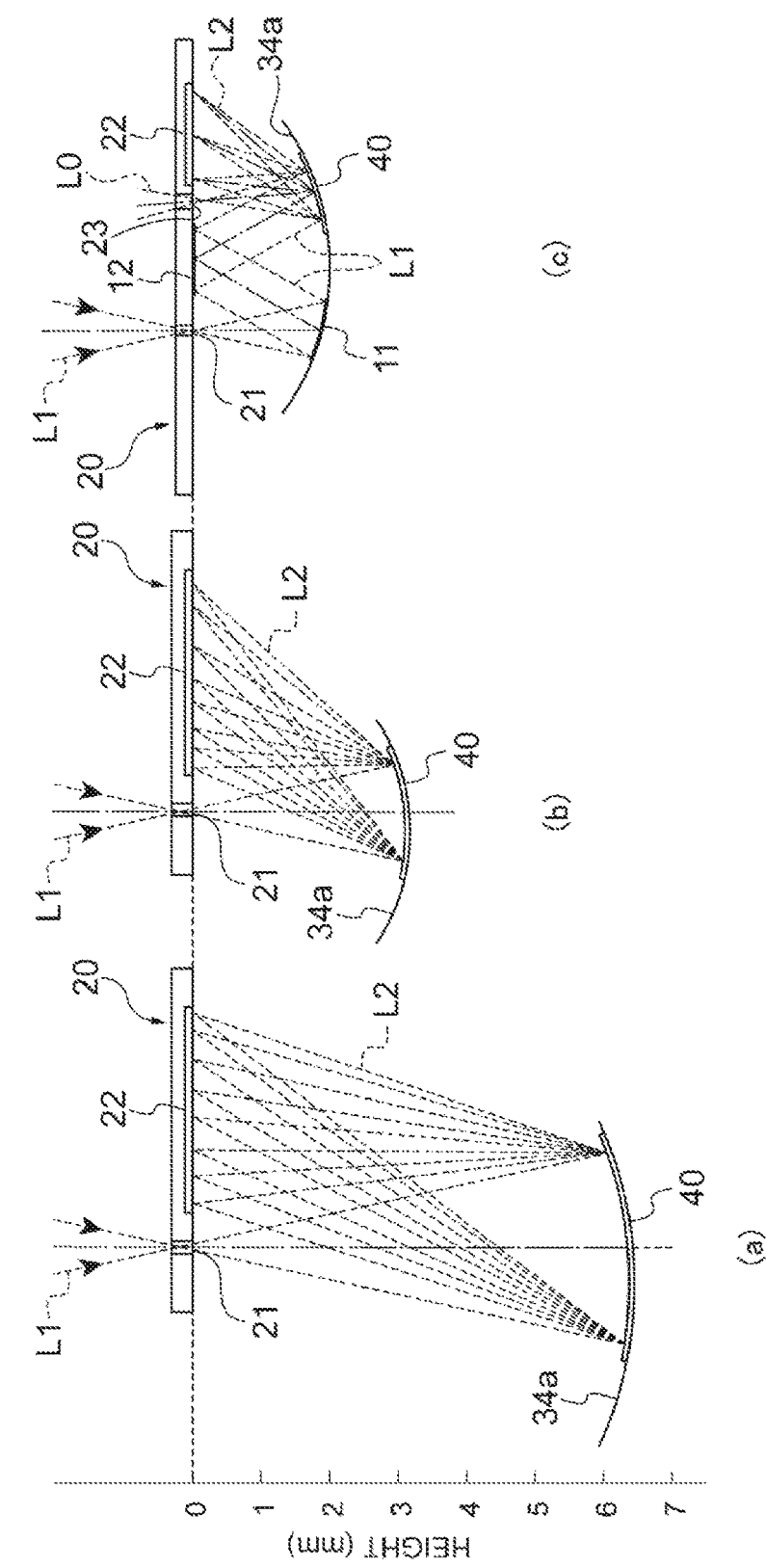
FIG. 11 is a diagram illustrating a relationship between miniaturization of a spectrometer and the radius of curvature of the spectrometer.

As illustrated in FIG. 11, in a spectrometer of FIG. 11(a) and a spectrometer of FIG. 11(b), light L1 passing through a light passing part 21 directly enters a dispersive part 40, and light L2 dispersed and reflected by the dispersive part 40 directly enters a light detection part 22. In a spectrometer of FIG. 11(c), the light L1 passing through the light passing part 21 is reflected by a first reflection part 11 and a second reflection part 12 in sequence, and enters the dispersive part 40, and the light L2 dispersed and reflected by the dispersive part 40 directly enters the light detection part 22. In the spectrometer of FIG. 11(a), the radius of curvature of an inner surface 34a on which the dispersive part 40 is formed is 6 mm. In the spectrometer of FIG. 11(b), the radius of curvature of the inner surface 34a on which the dispersive part 40 is formed is 3 mm. In the spectrometer of FIG. 11(c), the radius of curvature of the inner surface 34a on which the first reflection part 11 and the dispersive part 40 are formed is 4 mm.

First, the spectrometer of FIG. 11(a) and the spectrometer of FIG. 11(b) are compared. The height (height in a Z-axis direction) of the spectrometer of FIG. 11(b) is lower than the height of the spectrometer of FIG. 11(a) since a distance at which the dispersive part 40 concentrates the light L2 on the light detection part 22 becomes shorter as the radius of curvature of the inner surface 34a on which the dispersive part 40 is formed becomes smaller.

However, as the radius of curvature of the inner surface 34a on which the dispersive part 40 is formed is made smaller, various problems occur as below. That is, a focus line of the light L2 (a line connecting positions on which the light L2 having different wavelengths is concentrated) is easily distorted. In addition, influence of various aberrations becomes great, and thus there is difficulty in making correction by designing a grating. Further, in particular, the angle of diffraction to a long wavelength side becomes excessive, and thus a grating pitch needs to be narrowed. However, when the grating pitch becomes narrow, there is difficulty in forming a grating. Furthermore, blazing is necessary to increase sensitivity. However, when the grating pitch is narrowed, there is difficulty in blazing. In addition, in particular, the angle of diffraction to the long wavelength side becomes excessive, and thus it is disadvantageous in terms of resolving power of the light L2.

The above-mentioned various problems occur since it is practical to configure the light passing part 21 such that the light L1 passes in a direction perpendicular to surfaces 24a and 24b of a substrate 24 of a light detection element 20 when the light passing part 21 is provided as a slit on the substrate 24. In addition, the problems occur since there is a restriction that zero-order light L0 should be reflected on the opposite side to the light detection part 22 side.

On the other hand, in the spectrometer of FIG. 11(c), even though the radius of curvature of the inner surface 34a on which the first reflection part 11 and the dispersive part 40 are formed is 4 mm, the height of the spectrometer of FIG. 11(c) is lower than the height of the spectrometer of FIG. 11(b) since an incident direction of the light L1 entering the dispersive part 40 and a divergence or convergence state of the light L1 may be adjusted using the first reflection part 11 and the second reflection part 12 in the spectrometer of FIG. 11(c).

As described in the foregoing, it is practical to configure the light passing part 21 such that the light L1 passes in the direction perpendicular to the surfaces 24a and 24b of the substrate 24 of the light detection element 20 when the light passing part 21 is provided as a slit on the substrate 24. In this case, when the first reflection part 11 and the second reflection part 12 are used, miniaturization of the spectrometer may be attempted. In the spectrometer of FIG. 11(c), the fact that the zero-order light L0 can be captured by a zero-order light capture part 23 which is positioned between the second reflection part 12 and the light detection part 22 is a great feature in attempting miniaturization of the spectrometer while suppressing a decrease in detection accuracy of the spectrometer.

[Superiority in Optical Path from Dispersive Part to Light Detection Part]

Figure 12:
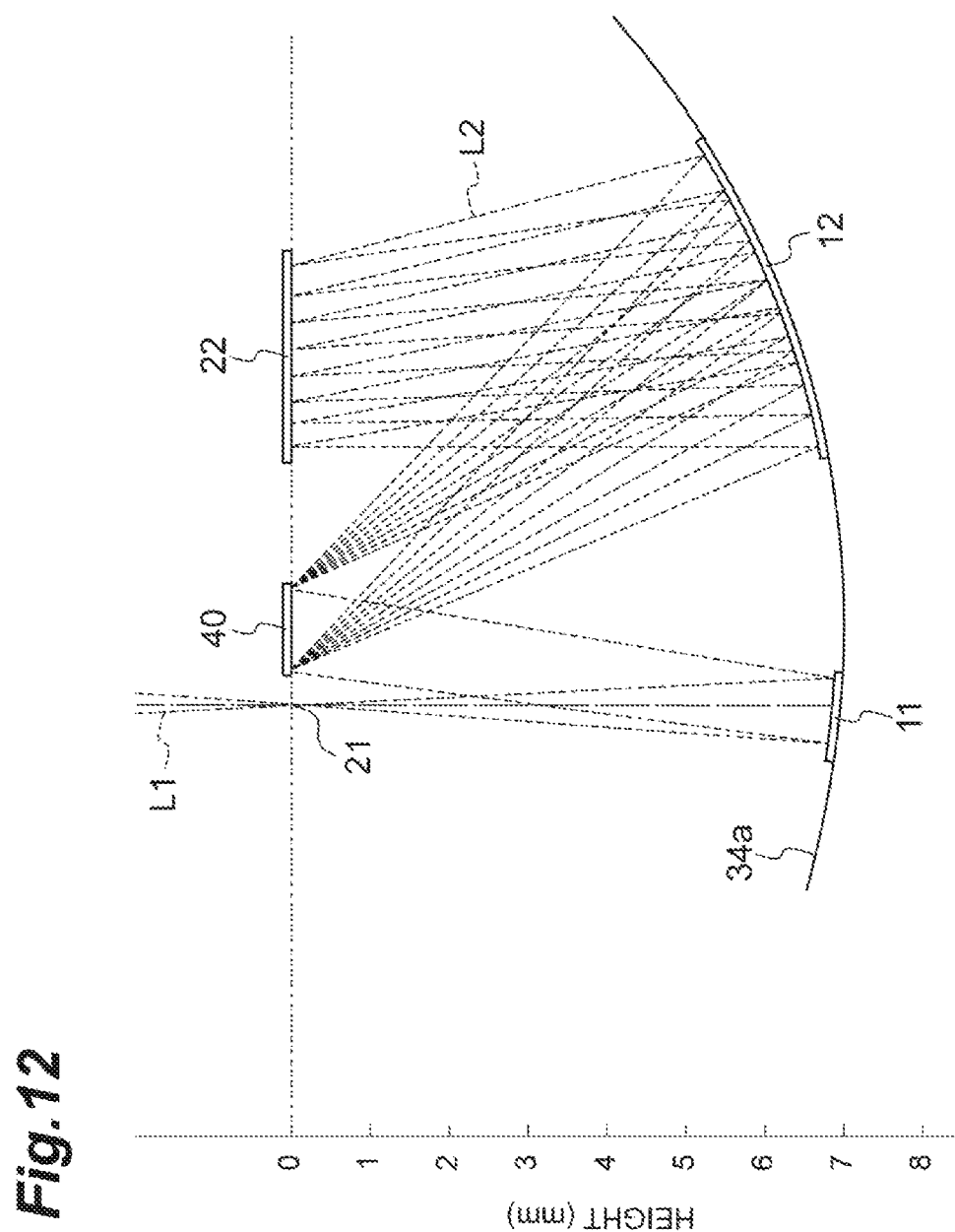
FIG. 12 is a diagram illustrating a configuration of a spectrometer in accordance with a comparative example.

First, a spectrometer will be examined. Here, as illustrated in FIG. 12, the spectrometer adopts an optical path that reaches a light detection part 22 from a light passing part 21 via a first reflection part 11, a dispersive part 40, and a second reflection part 12 in sequence. In the spectrometer of FIG. 12, light L1 is dispersed and reflected by the dispersive part 40 which is a planar grating. Then, light L2 dispersed and reflected by the dispersive part 40 is reflected by the second reflection part 12 which is a concave mirror, and enters the light detection part 22. In this case, respective rays of the light L2 enter the light detection part 22 such that positions, on which the respective rays of the light L2 are concentrated, are close to one another.

In the spectrometer of FIG. 12, when a wavelength range of detected light L2 is attempted to be widened, the radius of curvature of the inner surface 34a on which the dispersive part 40 is formed and a distance between the second reflection part 12 and the light detection part 22 need to be increased. Further, since the respective rays of the light L2 enter the light detection part 22 such that positions, on which the respective rays of the light L2 are concentrated, are close to one another, the radius of curvature of the inner surface 34a and the distance between the second reflection part 12 and the light detection part 22 need to be increased. When a distance between the positions, on which the respective rays of the light L2 are concentrated, is excessively widened by narrowing a grating pitch (a distance between grating grooves), there is difficulty in adjusting a focus line of the light L2 to the light detection part 22. In this way, the optical path, which reaches the light detection part 22 from the light passing part 21 via the first reflection part 11, the dispersive part 40, and the second reflection part 12 in sequence, can be regarded as an unfit optical path for miniaturization.

On the other hand, as illustrated in FIG. 11(c), in the spectrometer that adopts an optical path that reaches the light detection part 22 from the light passing part 21 via the first reflection part 11, the second reflection part 12, and the dispersive part 40 in sequence (that is, a spectrometer corresponding to the spectrometers 1A to 1D described above), respective rays of light L2 enter the light detection part 22 such that positions, on which the respective rays of the light L2 are concentrated, are separated from one another. Therefore, the optical path that reaches the light detection part 22 from the light passing part 21 via the first reflection part 11, the second reflection part 12, and the dispersive part 40 in sequence can be regarded as a suitable optical path for miniaturization. The above description can be understood from the fact that the radius of curvature of the inner surface 34a is 4 mm, and the height (height in the Z-axis direction) is about 2 mm in the spectrometer of FIG. 11(c) while the radius of curvature of the inner surface 34a is 12 mm, and the height is 7 mm in the spectrometer of FIG. 12.

Hereinbefore, the first to fourth embodiments of the invention have been described. However, the invention is not restricted to the above respective embodiments. For example, even though the entrance NA of the light L11 entering the space S is defined by the shapes of the light passing part 21 of the light detection element 20 and the light transmitting opening 52a of the light shielding film 52 (the light transmitting opening 53a of the light shielding film 53 depending on cases) in the first and second embodiments, the entrance NA of the light L1 entering the space S may be practically defined by adjusting a shape of a region of at least one of the first reflection part 11, the second reflection part 12, and the dispersive part 40. The light L2 entering the light detection part 22 is diffracted light, and thus the entrance NA may be practically defined by adjusting a shape of a predetermined region in which the grating pattern 41a is formed in the molded layer 41.

In addition, even though the terminal 25 of the light detection element 20 and the end part 13a of the wiring 13 opposing each other are connected to each other by the bump 14 in the above respective embodiments, the terminal 25 of the light detection element 20 and the end part 13a of the wiring 13 opposing each other may be connected to each other by soldering. Further, the terminal 25 of the light detection element 20 and the end part 13a of the wiring 13 opposing each other may be connected to each other on the end surface 33a of each side wall part 33 of the support 30 rather than only on the end surface 32a of each side wall part 32 of the support 30. Alternatively, the terminal 25 and the end part 13a may be connected to each other on the end surface 32a of each side wall part 32 and the end surface 33a of each side wall part 33 of the support 30. Furthermore, in the spectrometers 1A and 1B, the wiring 13 may be enclosed on a surface on the opposite side from the space S side in the support 30. In addition, in the spectrometers 1C and 1D, the wiring 13 may be enclosed on a surface on the space S side in the support 30.

In addition, the material of the support 30 is not restricted to ceramic, and another molding material, for example, resin such as LCP, PPA, and epoxy, and glass for molding may be used as the material. Further, the package 60B may have a shape of a rectangular parallelepiped box. Furthermore, when the space S is airtightly sealed by the package 60B that accommodates the light detection element 20 and the support 30, the support 30 may have a plurality of pillar parts or a plurality of side wall parts separated from one another in place of the pair of side wall parts 32 and the pair of side wall parts 33 which surround the space S. In this way, materials and shapes of respective components of the spectrometers 1A to 1D are not restricted to the above-described materials and shapes, and various materials and shapes may be applied thereto.

In addition, in the spectrometers 1A, 1B, 1C, and 1D, the light L1 passing through the light passing part 21 may be directly let into the dispersive part 40, and the light L2 dispersed and reflected by the dispersive part 40 may be directly let into the light detection part 22 without using the first reflection part 11 and the second reflection part 12. Even in this case, it is possible to sufficiently miniaturize the dispersive part while suppressing a decrease in detection accuracy of the spectrometer.

In addition, the end part 13b of the wiring 13 may be positioned in the region around the depression 34 on the surface 31a of the base wall part 31 when viewed in a thickness direction of the base wall part 31 (that is, the Z-axis direction). In this case, it is possible to inhibit the dispersive part 40 from being deformed due to an external force acting on the end part 13b of the wiring 13.

INDUSTRIAL APPLICABILITY

The invention can provide a spectrometer which can attempt miniaturization while suppressing a decrease in detection accuracy, and a method for manufacturing a spectrometer capable of easily manufacturing such a spectrometer.

REFERENCE SIGNS LIST 1A, 1B, 1C, 1D: spectrometer; 11: first reflection part; 12: second reflection part; 13: wiring; 13a: end part (first end part); 13b: end part (second end part); 20: light detection element; 21: light passing part; 22: light detection part; 25: terminal; 30: support; 31: base wall part; 31a: surface (first surface); 31h: surface (second surface); 34: depression; 34a: inner surface; 40: dispersive part; 60A, 60B: package; S: space; RL: reference line.

The invention claimed is:

1. A spectrometer comprising:
a light detection element having a substrate made of a semiconductor material, a light passing part provided in the substrate, and a light detection part put in the substrate;
a support having a base wall part opposing the light detection element through a space, and side wall parts integrally formed with the base wall part, the light detection element being fixed to the side wall parts, the support being provided with a wiring electrically connected to the light detection part; and
a dispersive part provided on a first surface of the base wall part on a side of the space and configured to disperse and reflect light passing through the light passing part to the light detection part in the space,
wherein the wiring has a first end part on a side of the light detection part, a second end part on an opposite side from the side of the light detection part, and a connection part extending from the first end part to the second end part,
the first end part is electrically connected to a terminal provided on a surface of the light detection element on a side of the space, and
the second end part and the connection part are formed on an outer surface of the support on the opposite side from the space side.

2. The spectrometer according to claim 1,
wherein a depression open to the side of the space is formed in the base wall part, and
the dispersive part is provided on an inner surface of the depression.

3. The spectrometer according to claim 2, wherein the second end part of the wiring is positioned so as to surround from all sides the entire depression on a second surface of the base wall part on an opposite side from the side of the space.

4. The spectrometer according to claim 1, further comprising:
a first reflection part provided in the support and configured to reflect the light passing through the light passing part in the space; and
a second reflection part provided in the light detection element and configured to reflect the light reflected by the first reflection part to the dispersive part in the space.

5. The spectrometer according to claim 1, wherein the first end part of the wiring is connected to the terminal of the light detection element in a fixed part of the light detection element and the support.

6. The spectrometer according to claim 1, wherein a material of the support is ceramic.

7. The spectrometer according to claim 1, wherein the space is airtightly sealed by a package including the light detection element and the support as components.

8. The spectrometer according to claim 1, wherein the space is airtightly sealed by a package accommodating the light detection element and the support.

* * * * *